US011885632B2

(12) United States Patent
Aggarwal et al.

(10) Patent No.: US 11,885,632 B2
(45) Date of Patent: Jan. 30, 2024

(54) CONDITIONAL PREPARATION FOR AUTOMATED ASSISTANT INPUT FROM A USER IN A VEHICLE

(71) Applicant: Google LLC, Mountain View, CA (US)

(72) Inventors: Vikram Aggarwal, Palo Alto, CA (US); Steven B. Huang, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 450 days.

(21) Appl. No.: 17/231,926

(22) Filed: Apr. 15, 2021

(65) Prior Publication Data

US 2022/0333947 A1    Oct. 20, 2022

(51) Int. Cl.
*G01C 21/36* (2006.01)

(52) U.S. Cl.
CPC ..... *G01C 21/3608* (2013.01); *G01C 21/3617* (2013.01)

(58) Field of Classification Search
CPC .................. G10C 21/3608; G10C 21/3617
USPC .......................................................... 704/275
See application file for complete search history.

(56) References Cited

U.S. PATENT DOCUMENTS

| 10,160,463 | B1 * | 12/2018 | Weaver ............... | B60W 40/08 |
| 2012/0016678 | A1 * | 1/2012 | Gruber ................. | G10L 15/183 |
| | | | | 704/E21.001 |
| 2016/0098992 | A1 | 4/2016 | Renard et al. | |
| 2019/0159166 | A1 * | 5/2019 | Aggarwal ............ | B60W 40/08 |

FOREIGN PATENT DOCUMENTS

DE    112015006545 T5 *    2/2018    ............ G06Q 10/02

OTHER PUBLICATIONS

J. F. Dillenburg, O. Wolfson and P. C. Nelson, "The Intelligent Travel Assistant," Proceedings. The IEEE 5th International Conference on Intelligent Transportation Systems, Singapore, 2002, pp. 691-696, doi: 10.1109/ITSC.2002.1041302. (Year: 2002).*

N. Reddy, C. Papachristou and F. Wolff, "On board assistant to GPS navigation of vehicles," Proceedings of the IEEE 2009 National Aerospace & Electronics Conference (NAECON), Dayton, OH, USA, 2009, pp. 7-13, doi: 10.1109/NAECON.2009.5426660. (Year: 2009).*

(Continued)

*Primary Examiner* — Bharatkumar S Shah
(74) *Attorney, Agent, or Firm* — Gray Ice Higdon

(57) ABSTRACT

Implementations set forth herein relate to pre-emptively initializing an automated assistant in a vehicle according to certain indications, in order to reduce latency while also seeking to preserve computational resources. In some implementations, data for effectuating one or more features of an automated assistant can be loaded into memory of a computing device based on vehicle interaction data. For example, the vehicle interaction data can characterize instances in which the user, from within their vehicle, invoked the automated assistant within a threshold period of time of an application completing an operation. Based on the vehicle interaction data, subsequent instances of the operation being completed while the user is in the vehicle can cause data to be loaded into memory in order to pre-emptively prepare the automated assistant to be utilized by the user.

20 Claims, 8 Drawing Sheets

(56) References Cited

OTHER PUBLICATIONS

S. Ilarri, T. Delot and R. Trillo-Lado, "A Data Management Perspective on Vehicular Networks," in IEEE Communications Surveys & Tutorials, vol. 17, No. 4, pp. 2420-2460, Fourthquarter 2015, doi: 10.1109/COMST.2015.2472395. (Year: 2015).*

* cited by examiner

CONDITIONAL PREPARATION FOR AUTOMATED ASSISTANT INPUT FROM A USER IN A VEHICLE

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, a user may access an automated assistant, via an interface of a computing device located within a vehicle, to cause the automated assistant to perform certain operations. However, due to the variability of network connections in traveling vehicles and/or due to constrained processing capabilities at a vehicle computing device, an automated assistant can exhibit latency in response to a user that invokes the automated assistant from a vehicle computing device.

For example, constraints in processing capabilities at the vehicle computing device can prevent the automated assistant from being primed to receive spoken commands at all times. For instance, some or all processes of the local automated assistant may not be preemptively loaded in memory prior to an initial use of the automated assistant and/or can be purged from memory after a period of non-use and/or to free resources for other process(es). This can result in latency in processing various user commands directed to the automated assistant, at least due to the latency in loading those process(es) into memory. As another example, the local automated assistant may not be continuously connected to a remote assistant server. This can be a result of an effort to preserve network resources and/or due to variations in network availability and/or conditions. Accordingly, when the assistant server is needed to resolve a user command directed to the automated assistant and a connection with the assistant server is not established, latency can result while the connection is established. In some situations, the experienced latency can result in the automated assistant not understanding a user command because a portion of the user command was not captured due to latency in loading process(es) into memory and/or latency in establishing communication with an assistant server. Computational resources may then be wasted in response to the user re-issuing certain commands that were not initially understood. For example, network bandwidth and memory can be consumed during instances in which a vehicle computing device processes commands re-issued by a user. Furthermore, user safety may be at risk when the user is re-issuing assistant commands while driving a vehicle and/or riding in the vehicle.

SUMMARY

Implementations set forth herein relate to pre-emptively loading one or more features of an automated assistant and/or pre-emptively establishing a network connection with an assistant server. Preemptively loading the feature(s) and/or pre-emptively establishing the network connection can reduce latency that can occur when a user invokes their automated assistant from within a vehicle and/or can reduce latency in processing a corresponding command from the user that follows the invocation of the automated assistant.

Many implementations relate to only selectively pre-emptively loading the feature(s) and/or establishing the network connection in order to achieve the reduction in latency, while also preventing unnecessary over occurrence of preemptively loading the feature(s) and/or establishing the network connection. Over occurrence of pre-emptively loading the feature(s) can cause unneeded utilization of local resources and/or can cause other non-automated assistant active process(es) to be purged from memory, increasing latency associated with those other process(es). Over occurrence of pre-emptively establishing the network connection can cause excessive utilization of network resources and/or can result in constraints on the bandwidth available to other non-automated assistant active process(es).

Accordingly, various implementations disclosed herein seek to balance the desire to achieve reduction in latency with the computational and/or network drawback(s) that can result from preemptively performing action(s) to achieve the reduction in latency. As described herein, some of those various implementations utilize interaction data to enable differentiation between situations in which preemptively performing action(s) to reduce latency is warranted (e.g., those situations in which a corresponding user is sufficiently likely to utilize the automated assistant) and alternate situations in which preemptively performing action(s) to reduce latency is not warranted (e.g., those situations in which a corresponding user is not sufficiently likely to utilize the automated assistant, and preemptively performing the action(s) would unnecessarily consume computational and/or network resources). The interaction data can be based on past automated assistant interaction(s) of the corresponding user and/or past automated assistant interaction(s) of other user(s). As described herein, such interaction data can optionally reflect whether, and/or to what extent, automated assistant interactions occurred in response to occurrence of events of one or more certain categories (e.g., incoming messages, cessation of an ongoing call) and/or context(s) related to those event(s) (e.g., navigational stage when the event occurred, a source of the incoming message, a date or time of the cessation of the ongoing call, etc.).

In order to maintain the responsiveness of the automated assistant while in a vehicle, various characteristics of context(s) in which a user initializes an automated assistant from within a vehicle can be captured as interaction data that can be processed. The interaction data can be processed to determine when to pre-emptively initialize certain operations associated with the automated assistant. For example, data that is relied upon by the automated assistant can be pre-emptively retrieved from a remote server device and/or loaded into memory of the vehicle computing device. For instance, a local automatic speech recognition (ASR) process utilized by the automated assistant can be preemptively loaded into memory. In these and other manners, any automated assistant features that rely on the data can be accessed by the user without latency in the vehicle even when the vehicle is traveling in an area with limited network connection and/or the vehicle computing device is undertaking other processes.

As an example, interaction data associated with a user can characterize instances in which the user was listening to a respective podcast while in a vehicle that is driving to a respective destination. In some instances, the user may have invoked their automated assistant from a vehicle computing device of the vehicle when a respective podcast completes outside of a threshold amount of time of arriving at a respective destination. In other instances, the user may have avoided invoking their automated assistant from the vehicle computing device of the vehicle when a respective podcast completes, or other media ceased rendering certain information at an interface, within the threshold amount of time of an estimated time of arrival at the destination. Based on this interaction data, operations can be performed in subsequent instances to prepare for the user to invoke the automated assistant when a podcast ends and/or other media ceases to be rendered during a drive/ride. For example, and according to the interaction data, the user may typically request that the automated assistant play a "driving playlist" when the podcast ends outside of a threshold amount of time of the vehicle arriving at a destination. Therefore, the one or more operations that are initialized can include retrieving ASR-related data for responding to spoken utterances from the user and media data for buffering some amount of the "driving playlist." However, when the podcast is estimated to end within the threshold amount of time of the user arriving at the destination, the one or more operations can be bypassed and/or one or more other operations can be initialized (e.g., to prepare for the arrival of the user at the destination).

In some implementations, the interaction data can be generated to characterize instances in which the user receives, while in their vehicle, a respective electronic communication from another person, and then initializes their automated assistant to perform one or more operations. For example, in some instances the user may have requested that the automated assistant perform a particular action (e.g., set a reminder) within a threshold amount of time of receiving an electronic communication having one or more characteristics and/or criteria. The one or more criteria and/or characteristics can be, but are not limited to, whether a communication is from a stored contact, a relative, someone in a particular location, and/or a co-worker. Alternatively, or additionally, the one or more characteristics can be, but are not limited to, a time of receipt, a time of sending, certain content of the electronic communication (e.g., text, video, images, URL link, etc.), length of the electronic communication, a time of receipt relative to an arrival time of a vehicle, and/or any other characteristic(s) of one or more electronic communications.

The interaction data can then be processed in furtherance of determining whether to initialize one or more particular operations for preparing the automated assistant to receive an input from the user within a threshold amount of time of the user receiving an electronic communication while in their vehicle. For example, the interaction data can indicate that the user typically invokes their automated assistant to set a reminder when the user receives a phone call from a certain subset of contacts (e.g., co-workers and/or contacts with a certain domain in their respective email addresses) of their stored contacts. Thereafter, when the user is in their vehicle and receives another phone call from a contact of the certain subset of contacts, the one or more operations can be initialized. In some implementations, the one or more operations can include loading, into memory of the vehicle computing device, data corresponding to a calendar application and the automated assistant. In this way, a request to set a reminder via the automated assistant can be readily processed while the user is participating in a phone call and/or within a threshold amount of time of the phone call ending.

In some implementations, interaction data that is accessible to the automated assistant can characterize instances in which a user invokes the automated assistant after modifying a destination for a navigation application. Alternatively, or additionally, the destination can be modified when a vehicle is in route to an initial destination, but the user receives an electronic communication or other notification associated with the route. Thereafter, the interaction data can be processed to determine when to prepare a vehicle computing device to receive an input that is directed to an automated assistant. For example, the vehicle can provide access to a navigation application that can operate when the vehicle is driving to a destination. The user can interact with the navigation application and/or another application to modify the destination for the vehicle. Based on the interaction data associated with the user, the vehicle computing device and/or another computing device can cause one or more operations to be initialized to prepare for the user to provide a request to the automated assistant within a threshold amount of time of modifying the destination.

For example, the interaction data can indicate that the user typically requests that the automated assistant read a store review to the user within a threshold amount of time of modifying a destination for the vehicle so that the vehicle drives to a corresponding store. Therefore, when the user modifies the destination of the vehicle, the one or more operations can be initialized in order to retrieve media data associated with store reviews (e.g., a review of the store that the vehicle has most recently been requested to drive to) and/or establish a secure connection with an automated assistant server. In some implementations, authentication data can be communicated from a portable computing device (e.g., a user's cellular phone) and/or a vehicle computing device to a server device, to establish a secure connection. In this way, a secure connection for communicating input data can be established before the user provides an input to the automated assistant. This can reduce latency that can be exhibited when a user invokes an automated assistant shortly after another application performs an operation.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
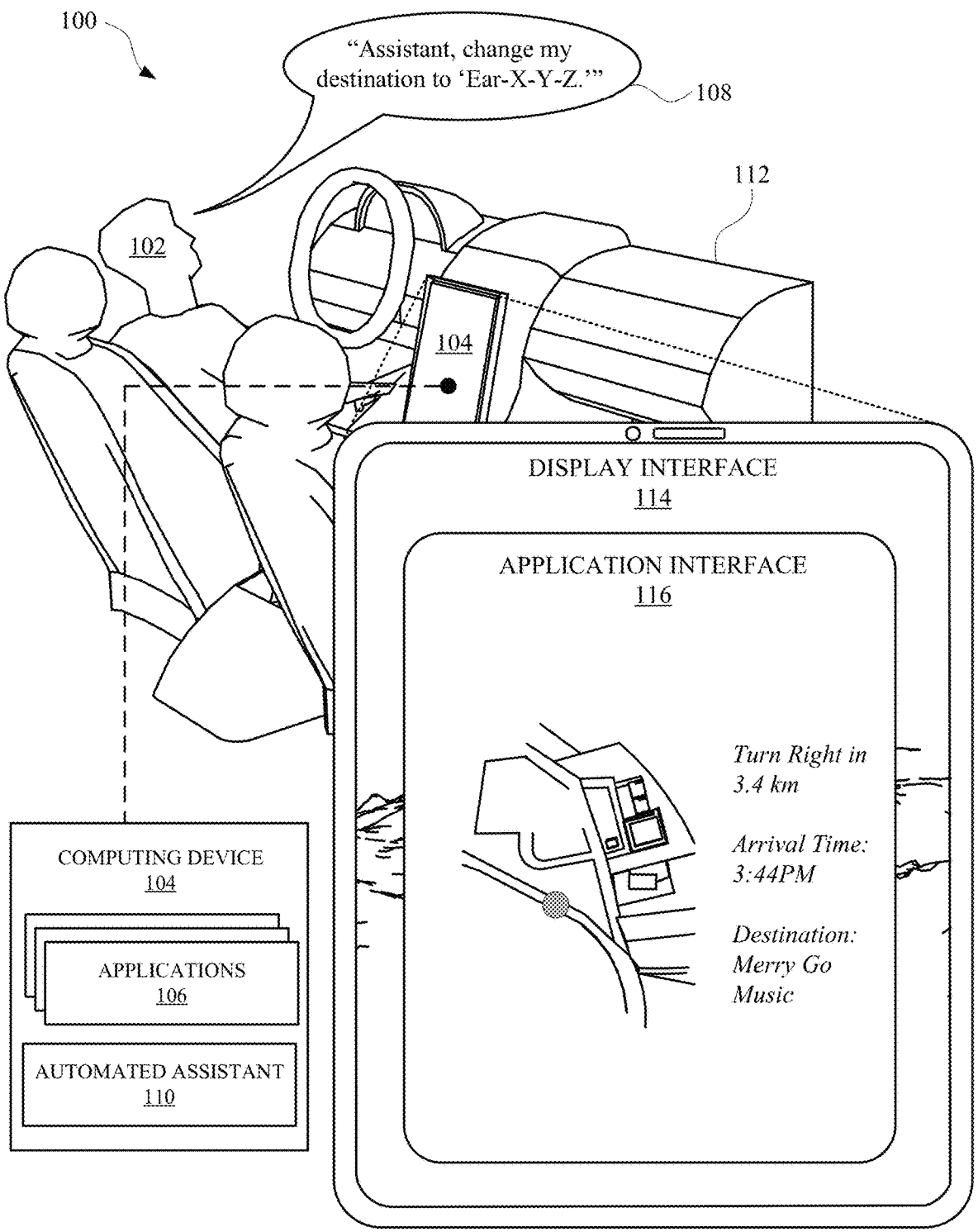
FIG. 1A, FIG. 1B, and FIG. 1C illustrate views of an automated assistant that preemptively initialize certain operations in order to reduce latency and/or promote safety when a user invokes the automated assistant from their vehicle.
Figure 1B:
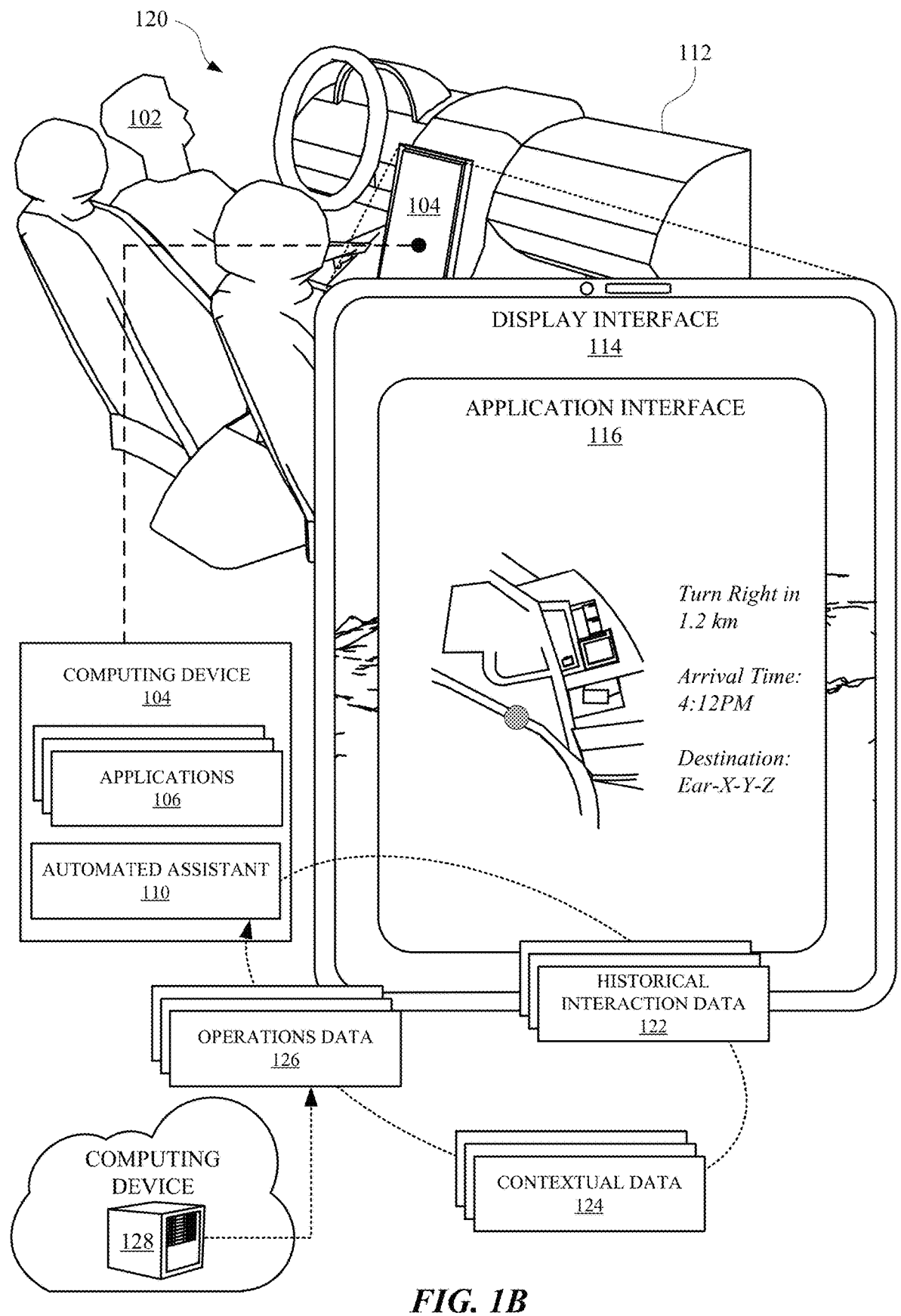
Figure 1C:
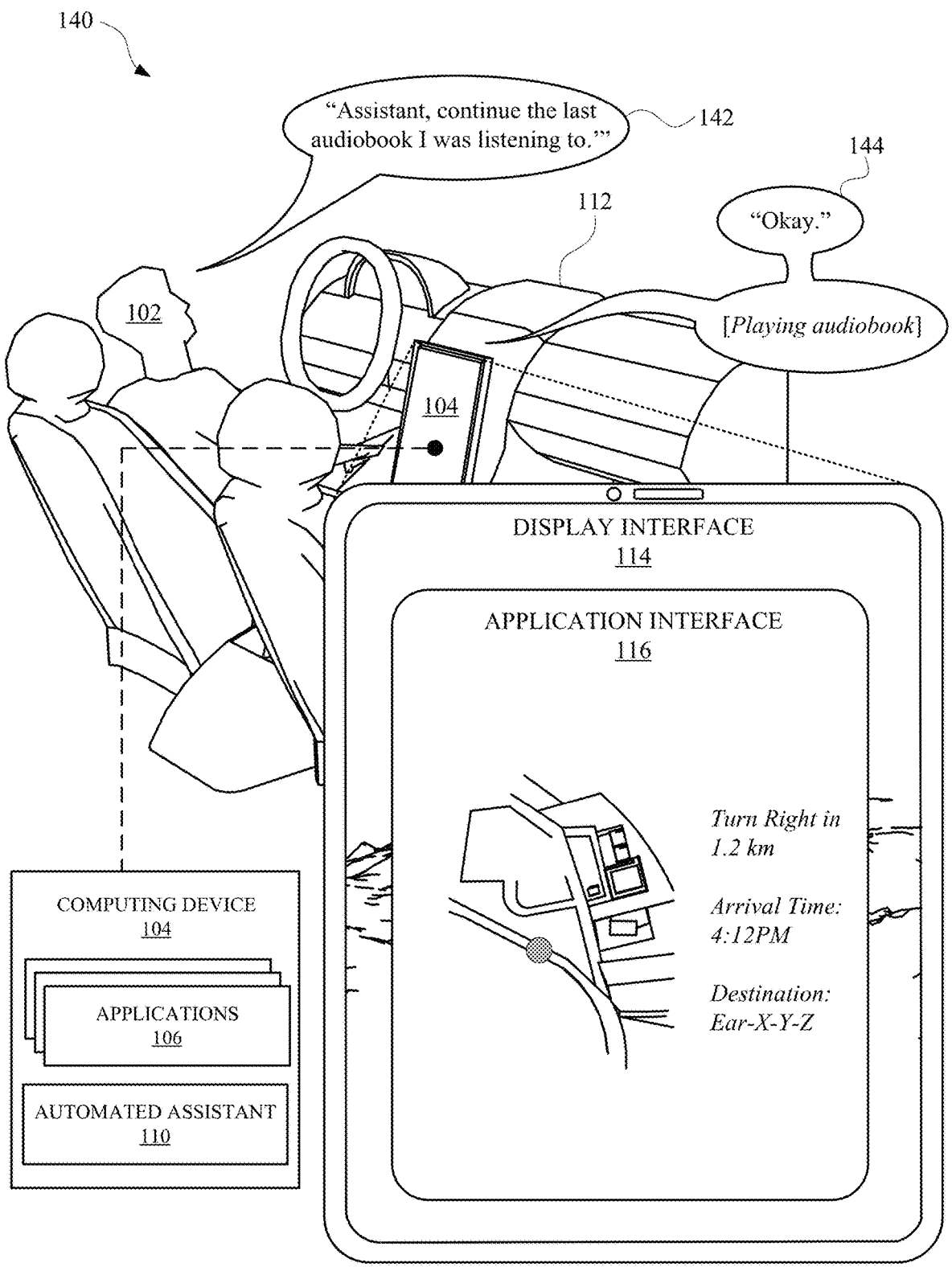

FIG. 1A, FIG. 1B, and FIG. 1C illustrate a view 100, a view 120, and a view 140 of an automated assistant 110 that preemptively initializes certain operations in order to reduce latency and promote safety when a user 102 invokes the automated assistant 110 from a vehicle 112. For example, the user 102 can be riding in a vehicle 112 that is driving to a destination and can request that the automated assistant 110 perform a particular action. The user 102 can provide a spoken utterance 108 such as, "Assistant, change my destination to Tar-X-Y-T" in order to change a destination that the vehicle 112 is driving towards. The spoken utterance 108 can be received at a vehicle computing device 104 and/or a separate computing device that provides access to the automated assistant 110. For example, the vehicle computing device 104 can be integral to the vehicle and can connect to one or more other computing devices that the user 102 carries in and out of the vehicle 112. The vehicle computing device can include a display interface 114, which can render an application interface 116, which can correspond to an application 106 that can be controlled via the automated assistant 110. For instance, the spoken utterance 108 can be processed by the automated assistant 110, which can cause one or more operations at the application 106 to undergo a status change. In some implementations, a status change of one or more operations of an application 106 can occur without express user input to undergo the status change. For example, when playback of an audiobook being rendered by an audiobook application of the vehicle computing device 104 ends, the end of the audiobook can correspond to a status change to an operation of media playback at the audiobook application. Alternatively, or additionally, a status change of an operation of an application can occur with or without a corresponding user input.

The automated assistant 110 and/or another application 106 or operating system of the computing device 104 can access historical interaction data 122 to identify prior instances in which the user 102 modified a destination that the vehicle 112 is driving towards. Identifying such instances can allow the automated assistant 110 to prepare for certain actions that the user 102 may request the automated assistant 110 to perform. For example, the historical interaction data 122 can indicate that the user 102 had previously modified a destination of a vehicle 112 and, subsequently, invoked the automated assistant 110 to initialize playback of an audiobook. Based on this indication, the automated assistant 110 can perform certain operations in order to prepare for a particular assistant input after the user modifies a destination of the vehicle 112.

For example, contextual data 124 can indicate that the user 102 provided the spoken utterance 108 to cause the destination of the vehicle 112 to change. The contextual data 124 and the historical interaction data 122 can be processed to determine that the user 102 is likely to issue a command to the automated assistant 110 to request playback of an audiobook. In order to reduce latency and preserve computational resources at the computing device 104, operations data 126 can be generated to identify one or more operations that can be performed in order to prepare for the command from the user 102 and the playback at the audiobook. For example, the operation data 126 can be generated at the computing device 104 and/or a separate computing device 128, and can be available at the computing device 104 prior to the user 102 requesting playback of the audiobook. In some implementations, the operations data 126 can include audio data corresponding to the audiobook, search results corresponding to a search performed preemptively, one or more web links, and/or any other data that can be used by an application to provide content and/or perform an action. In this way, the automated assistant 110 can exhibit less latency in response to a user input that is provided within a vehicle under certain contexts.

For example, the user 102 can provide a spoken utterance 142 within a threshold amount of time of modifying the destination for the vehicle 112. In some implementations, the threshold amount of time can be based on the interaction data 122 and/or prior instances in which the user 102 interacted with the automated assistant 110 within a certain amount of time of a particular event (e.g., an application status change). Therefore, when the threshold amount of time transpires after a particular event, memory and/or bandwidth preserved for a request to the automated assistant can be utilized by another application or device.

The spoken utterance 142 can be, for example, "Assistant, continue the last audiobook I was listening to." In response, the automated assistant can provide an output 144 (e.g., "Okay.") acknowledging the input from the user and then rendering playback of the audiobook. Playback of the audiobook can incorporate data generated based on the operations data 126 and/or other operations executed using the operations data 126. For example, the automated assistant can initialize the audiobook application and buffer a portion of the audiobook into memory. Alternatively, or additionally, features of the automated assistant can be initialized based on the operations data 126. Such features can include automatic speech recognition (ASR), which can correspond to functions and/or libraries that can be loaded into memory prior to the user providing the spoken utterance 142.

Figure 2:
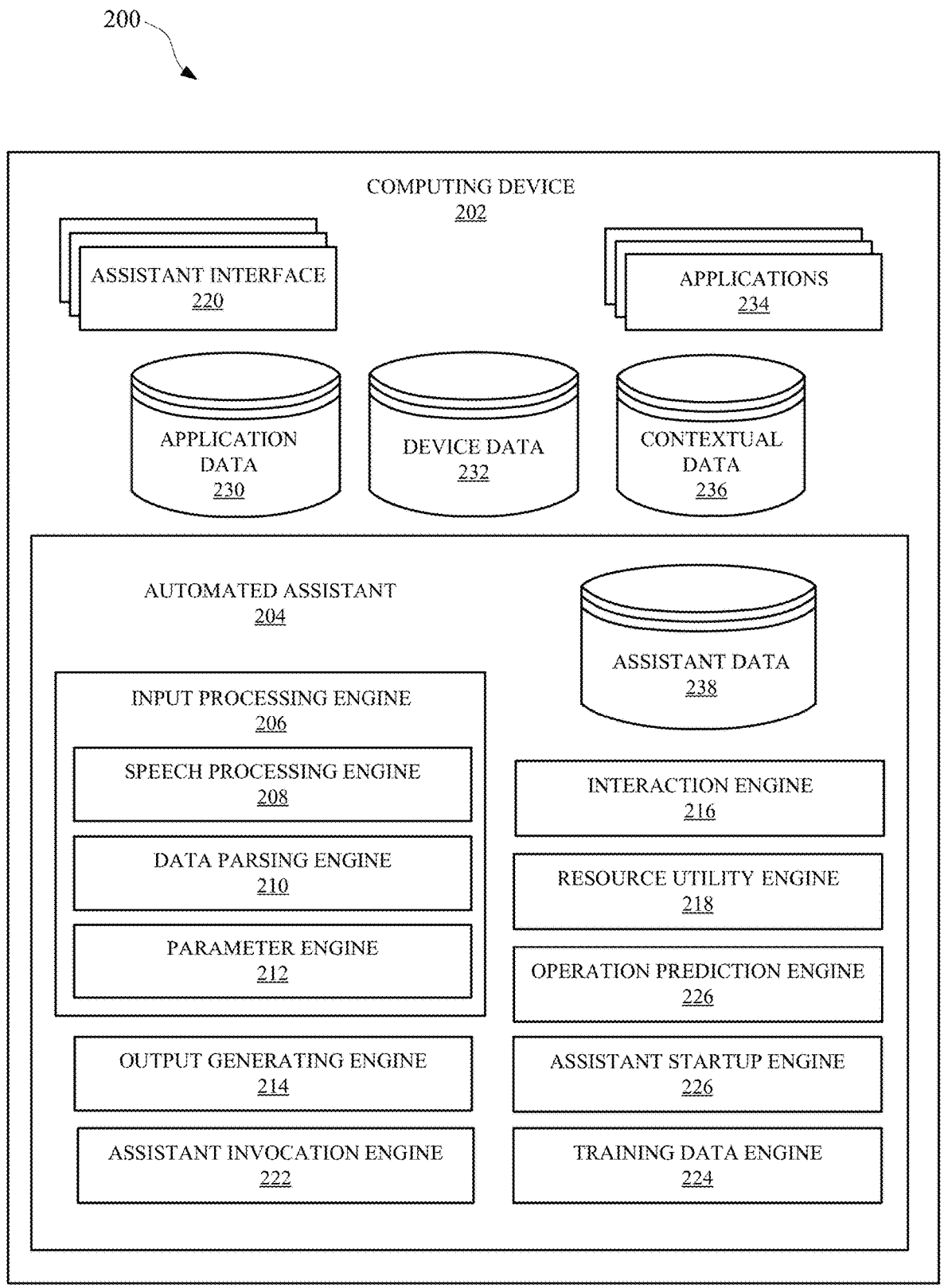
FIG. 2 illustrates a system for providing an automated assistant that can be pre-emptively prepared to perform an action and/or provide a response to a user based on various contextual characteristics associated with a vehicle.

FIG. 2 illustrates a system 200 for providing an automated assistant 204 that can be pre-emptively prepared to perform an action and/or provide a response to a user based on various contextual characteristics associated with a vehicle. The automated assistant 204 can operate as part of an assistant application that is provided at one or more computing devices, such as a computing device 202 and/or a server device. A user can interact with the automated assistant 204 via an assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of vehicle data and/or contextual data 236 using one or more trained machine learning models. The contextual data 236 and/or vehicle data can characterize, with prior permission from a user, one or more features of an environment in which the automated assistant 204 is accessible, and/or one or more features of the user that may interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting, for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

The system 200 can include an interaction engine 216 that can generate and/or process interaction data that characterizes interactions between one or more users and one or more automated assistants. In some implementations, the interaction data can be processed with other data that is available at the computing device 202 and/or a separate computing device. For example, application data 230 and assistant data 238 can be processed by the interaction engine 216 in order to generate interaction data that can be used to characterize one or more instances in which the user caused the automated assistant 204 to control an application 234. Alternatively, or additionally, device data 232 and/or contextual data 236 can be processed by the interaction engine 216 in order to generate interaction engine 216 that characterizes a state of one or more operations of a device and/or the user, with prior permission of the user, when generating interaction data. For example, the interaction data can be generated to characterize whether a user is riding in their vehicle and accessing a particular application during an instance in which the user invoked their automated assistant 204. This interaction data can then be used to pre-emptively prepare certain features of the computing device 202 (e.g., a vehicle computing device) to receiving a user input that is directed to the automated assistant 204.

Preemptively preparing for user inputs to the automated assistant 204 can be performed in instances when a resource utility engine 218 of the system 200 determines that a lack of memory or other computational resources may be available during forthcoming assistant interaction that is predicted to occur. For example, the resource utility engine 218 can process data accessible to the computing device 202 and/or a separate device to determine that a route the user is currently traveling includes an area with limited network connection. During such times, an automated assistant 204 may have to operate in an "offline" mode, as a result of the limited network connection. In such instances, the resource utility engine 218 can access interaction data generated by the interaction engine 216. The resource utility engine 218 can use the interaction data to determine whether there is a chance that the user will interact with the automated assistant 204 when the vehicle is traveling through the area with limited network connection and/or when the automated assistant 204 is predicted to be "offline." When there is a chance or probability that the user will access the automated assistant 204 when the computing device 202 is experiencing a lack of one or more computational resources (e.g., network bandwidth, processing bandwidth, memory, etc.), an operation prediction engine 226 can be initialized.

The operation prediction engine 226 can interact with the interaction engine 216 and/or the resource utility engine 218 in order to identify one or more operations that should be performed to prepare the automated assistant to receive user input(s) in certain circumstances. The one or more operations can be selected by the operation prediction engine 226 based on details of one or more interactions that the user may have with the automated assistant 204. In some implementations, the one or more operations can be selected based on one or more computational resources that may be limited at the time the user is estimated to interact with the automated assistant. For example, when the user is estimated to request playback of a podcast, the resource utility engine 218 can determine that memory may be limited during a certain portion of a route that the user is traveling.

Based on this determination, the operation prediction engine 226 can identify an operation of pre-emptively downloading the particular podcast in order to ensure that the podcast is stored in memory ahead of any other processes that may consume memory. Alternatively, or additionally, the operation prediction engine 226 can identify another operation of pre-emptively searching for a suitable podcast to present to the user to ensure that the search can be performed over a network (e.g., a cellular network), while there is suitable network connectivity. Alternatively, or additionally, the operation prediction engine 226 can identify an operation of pre-emptively executing a test query that is tagged as a type of non-user query. In this way, the test query (e.g., a search for a podcast or a store review) can be performed to test the connection with an assistant server without affecting a preference and/or search history stored in association with the user. Rather, the test query can be occasionally submitted to mimic an interaction between the automated assistant and the user, with prior permission from the user, but without rendering the test query and/or results of the test query at an assistant interface 220 of the computing device 202. In some implementations, the automated assistant 204 can perform an online test query and/or an offline test query, in order to test online and/or offline features of the automated assistant, respectively. This can assist with pre-emptively preparing the automated assistant 204 to receive a user input because both offline and online resources of a vehicle computing device can be limited under some circumstance when a user is riding in their vehicle.

In some implementations, the interaction engine 216 can employ one or more trained machine learning models for estimating whether one or more users will interact with their respective automated assistant in a particular context. For example, the interaction engine 216 can employ a first model for generally predicting interactions based on a set of multiple different users, and a second model for specifically predicting interactions based on a single user. In some implementations, each of the one or more models can be trained, with prior permission from each user, using training data that is generated using a training data engine 224. The training data engine 224 can generate training data that characterizes instances when a pre-emptive performance on one or more operations resulted in a more optimized allocation of computational resources. In other words, the training data engine 224 can be used to train one or more models according to whether pre-emptively performing one or more operations did or did not benefit subsequent assistant interactions.

Figure 3:
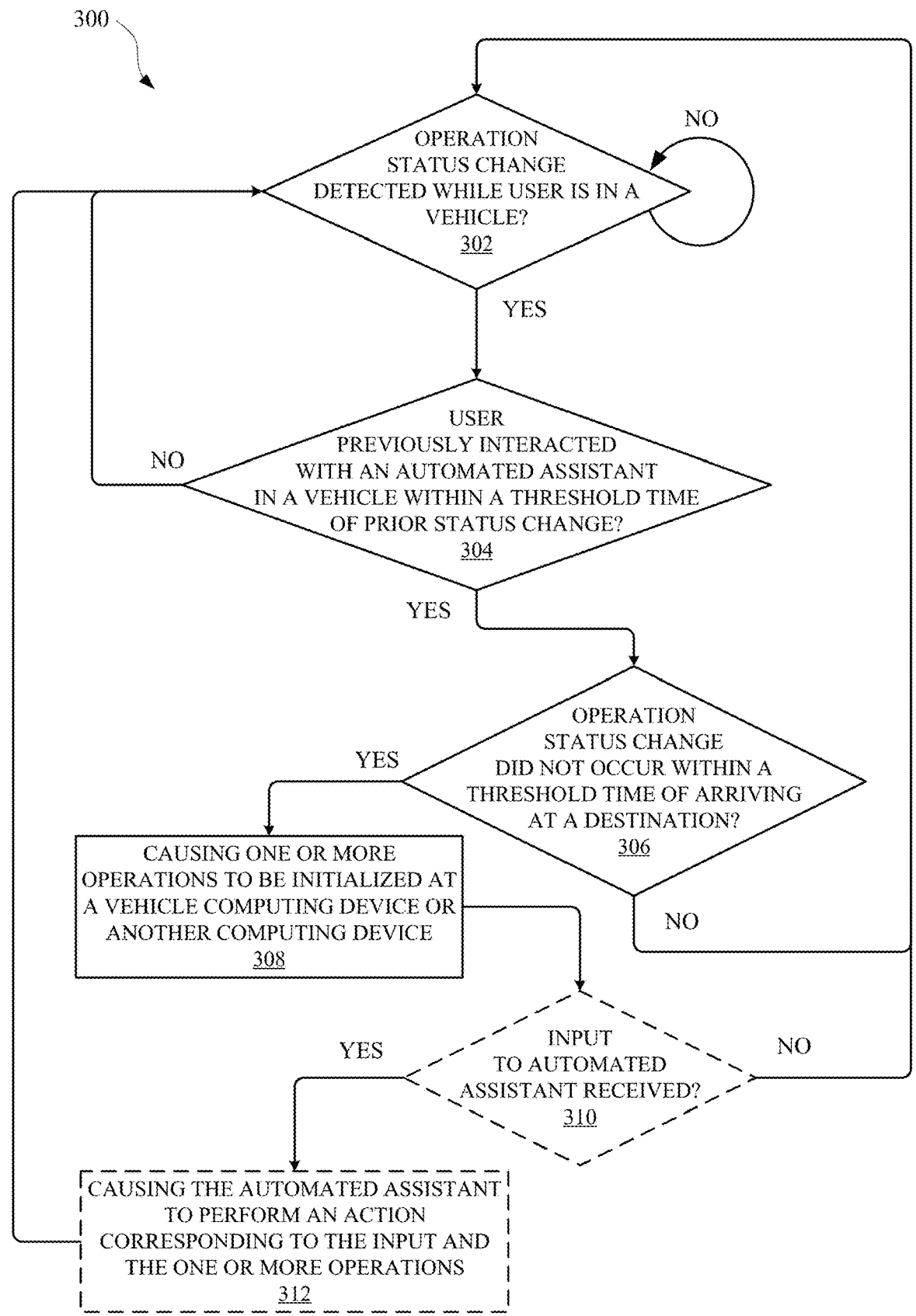
FIG. 3 illustrates a method for preparing an automated assistant to receive an input when certain contextual features are identified while a user is in a vehicle.

FIG. 3 illustrates a method 300 for preparing an automated assistant to receive an input when certain contextual features are identified while a user is in a vehicle. The method 300 can be performed by one or more devices, applications, and/or any other apparatus or module capable of interacting with an automated assistant. The method 300 can include an operation 302 of determining whether an operation status change has been detected while a user is in a vehicle. The operation status change can correspond to a change in an operation of a device and/or an application that is associated with the user and/or the vehicle. For example, an operation status change can correspond to a change in playback of media, completion of a download or an upload, receipt of electronic communication, termination of an electronic communication, a change in network bandwidth, a change in battery status, and/or any other change (or combination of changes) to an operation that can be associated with any application(s) and/or device(s).

When an operation status change has occurred, the method 300 can proceed from the operation 302 to an operation 304. Otherwise, the operation 302 can be performed until an operation status change is detected. The operation 304 can include determining whether the user had previously interacted with an automated assistant in a vehicle within a threshold amount of time of a prior status change. For example, during previous instances when the user is riding in a vehicle, the user may have a history of requesting the automated assistant to perform an action within an amount of time of a status change of an application. The status change can be, but is not limited to, for example, the end of the phone call and/or the end of a podcast. In such instances, the user may have a history of invoking an automated assistant when the status change did not occur within a threshold amount of time of arriving at a destination in the vehicle. In other words, when there is a particular amount of time left before the user arrives at a destination, the user typically invokes their automated assistant to initialize one or more different actions. Otherwise, when there is less than the particular amount of time left before the user arrives at the destination, the user may typically avoid invoking their automated assistant before arriving at the destination.

When prior interactions indicate that the user has interacted with their automated assistant within the threshold amount of time of a prior status change, the method 300 can continue to an operation 306. Otherwise, the method 300 can return to the operation 302. The operation 306 can include determining whether the operation status change did not occur within another threshold period of time of arriving at the destination. When the operation status change is determined to not have occurred within the other threshold period of time of arriving at the destination, the method 300 can proceed to an operation 308. Otherwise, the method 300 can return to the operation 302 and/or another operation. The operation 308 can include causing one or more operations to be initialized at a vehicle computing device or another computing device. The one or more operations can include, for example: a search process that is utilized by the automated assistant to retrieve requested data; an ASR process for allowing the automated assistant to be responsive to speech; an authentication process for identifying a voice of the user and/or creating a secured connection with an assistant server and/or other remote server; a natural language understanding (NLU) process for determining how to respond to natural language inputs; a trial query process for "warming up" the automated assistant to receive a subsequent input; and/or any other process that can be associated with an automated assistant.

The method 300 can proceed from the operation 308 to an optional operation 310, which can include determining whether the automated assistant has received an input. In some implementations, the optional operation 310 can include determining whether the automated assistant has received an input that was not within the threshold amount of time of arriving at the destination. When an input to the automated assistant is received, the method 300 can proceed from the operation 310 to an optional operation 312. Otherwise, the method 300 can return to the operation 302 and/or another operation of the method 300. The optional operation 312 can include causing the automated assistant to perform an action corresponding to the input and the one or more operations. For example, the input can be a request for the automated assistant to list the items that are on a "grocery list" of the user. The one or more operations that were performed can include authenticating a connection between the vehicle computing device and an assistant server, with prior permission from the user, for the automated assistant to access a "grocery list" of the user. Alternatively, or additionally, the one or more operations can include storing, in memory of the vehicle computing device, data characterizing the grocery list and/or audio data corresponding to a voice of the automated assistant describing the grocery list. In this way, less latency can be exhibited between the user providing the input "Assistant, what's on my grocery list," and the automated assistant detailing what is on the grocery list "You have milk, eggs, and laundry detergent on your grocery list." Furthermore, providing more fluid interactions between a user who is in a vehicle and an automated assistant can promote the safety of the user.

Figure 4:
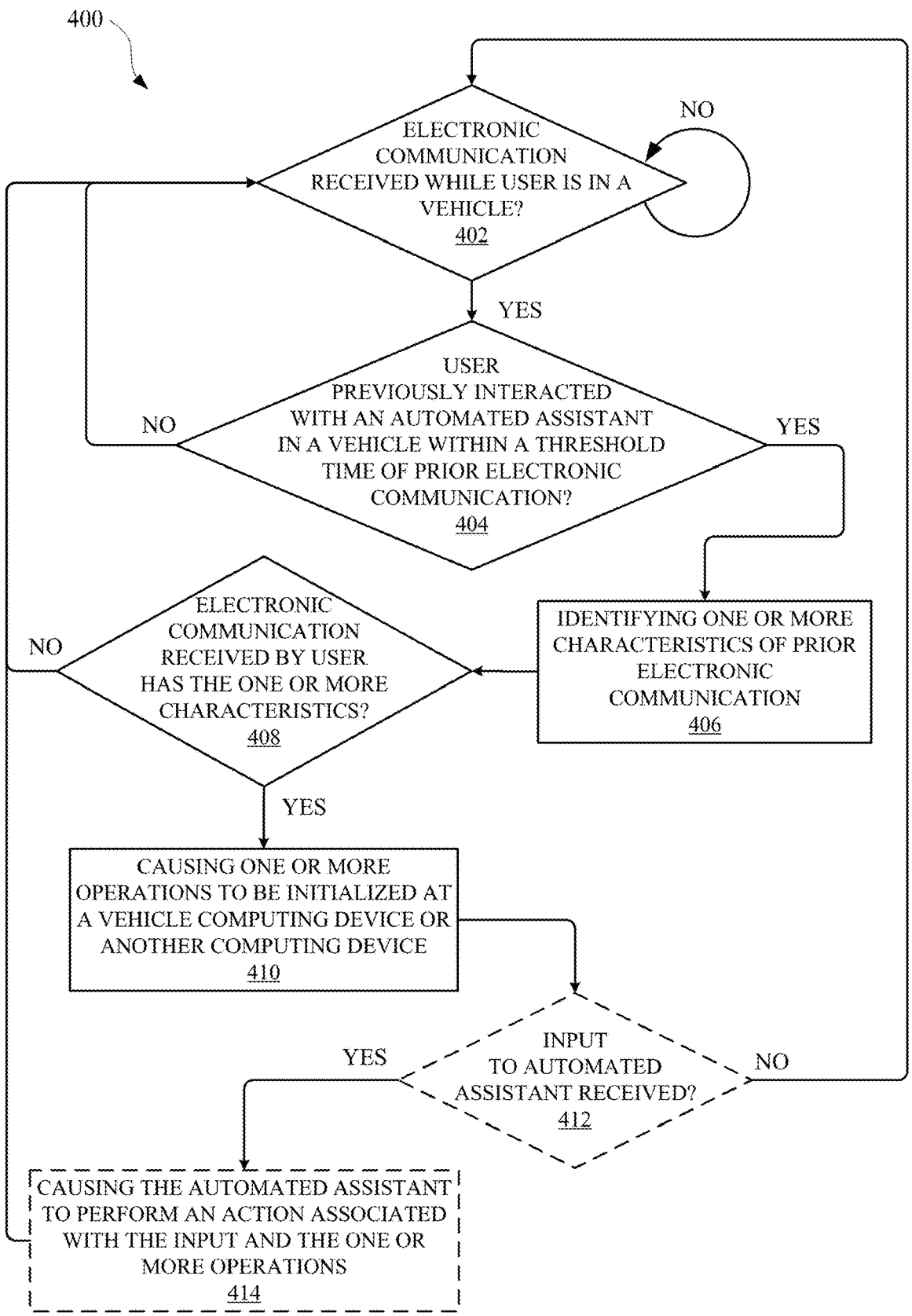
FIG. 4 illustrates a method for preparing an automated assistant to receive an input, while a user is in a vehicle, depending on whether the user received an electronic communication that has one or more characteristics.

FIG. 4 illustrates a method 400 for preparing an automated assistant to receive an input, while a user is in a vehicle, depending on whether the user received an electronic communication having one or more characteristics. The method 400 can be performed by one or more devices, applications, and/or any other apparatus or module capable of interacting with an automated assistant. The method 400 can include an operation 402 of determining whether an electronic communication has been received while a user is in a vehicle. An electronic communication can be, but is not limited to, data received from an application and/or a device associated with another user. For example, an electronic communication can be a text message or a phone call to the user from another user who is operating a separate computing device (e.g., a cellular phone). When an electronic communication is determined to have been received by the user while the user is in the vehicle, the method 400 can proceed from the operation 402 to an operation 404. Otherwise, the operation 402 can be performed until an electronic communication has been received by the user while the user is in the vehicle.

The operation 404 can include determining whether the user previously interacted with an automated assistant within a threshold amount of time of receiving an electronic communication. For example, the user may have previously invoked their automated assistant on multiple occasions within a threshold amount of time of receiving electronic communications. In some implementations, the threshold amount of time can be identified from interaction data characterizing prior instances in which the user invoked the automated assistant. For example, the threshold amount of time can be an average of previous periods between a user receiving an electronic communication and the user invoking the automated assistant. When the user is determined to have previously interacted with the automated assistant in the vehicle within the threshold amount of time of receiving a prior electronic communication, the method 400 proceed to an operation 406. Otherwise, the method 400 can return to the operation 402.

The operation 406 can include identifying, with prior permission from the user, one or more characteristics of a previous communication(s) associated with the user. For example, the one or more characteristics can include, but are not limited to, content of electronic communication, location of origin of the electronic communication, location of receipt of the electronic communication, particular time of day of receipt and/or transmission, length of the electronic communication, author of the electronic communication, one or more other recipients of the electronic communication, domain name in an address of the electronic communication, whether the author of the electronic communication corresponds to contact information that is stored in association with the user, and/or any other characteristics that can be associated with electronic communication(s).

The method 400 can proceed from the operation 406 to an operation 408, which can include determining whether the electronic communication received by the user has the one or more characteristics. For example, electronic communication can be received from another user whose contact information is stored in association with the user. This can be similar to prior instances in which the user received an electronic communication from another user whose contact information is stored in association with the user, and the user subsequently invoked the automated system. When the electronic communication received by the user is determined to have the one or more characteristics, the method 400 can proceed from the operation 408 to an operation 410. Otherwise, the method 400 can return to the operation 402 or another operation.

In some implementations, the electronic communication can be received from a co-worker of the user, and the contact information of the co-worker can include a domain name that identifies an employer of the user. In prior instances in which the user receives electronic communications from their employer while the user is in their vehicle, the user may have a habit of invoking their automated assistant to set a reminder and/or create a meeting event via their calendar application. Based on this habit of the user, the automated assistant and/or another application can perform one or more operations to prepare for any calendar-related inputs to the automated assistant and/or another application.

The operation 410 can include causing one or more operations to be initialized at the vehicle computing device or another computing device. The one or more operations can include initializing a calendar application for receiving an input for creating a reminder and/or an event. Alternatively, or additionally, the one or more operations can include downloading data from, and/or uploading data to, an assistant server that is associated with an automated assistant that is accessible via a vehicle computing device of the vehicle. This data can allow for a reduction in latency between the user providing input to the automated system and the automated assistant performing an action that is based on the input. Furthermore, this can preserve processor bandwidth that might otherwise be consumed performing one or more operations after the user provides the input.

The method 400 can proceed from the operation 410 to an optional operation 412, which can include determining whether an input to the automated assistant has been received. Alternatively, or additionally, the optional operation 412 can include determining whether the input to the automated assistant has been received within the threshold amount of time other user receiving the electronic communication. For example, the input to the automated assistant can correspond to a request for the automated assistant to set a reminder associated with the electronic communication (e.g., "Assistant, set a reminder for a 2:30 PM meeting today."). When the input is determined to have been received by the automated assistant, the method 400 can proceed to an optional operation 414. Otherwise, the method 400 can return to the operation 402 and/or another operation. The operation 414 can include causing the automated assistant to perform an action associated with the input and the one or more operations. For example, when the one or more operations include loading data corresponding to NLU processes of the automated assistant, the request from the user can be more readily understood by the automated assistant based on the data having already been loaded into memory prior to the user providing the request.

Figure 5:
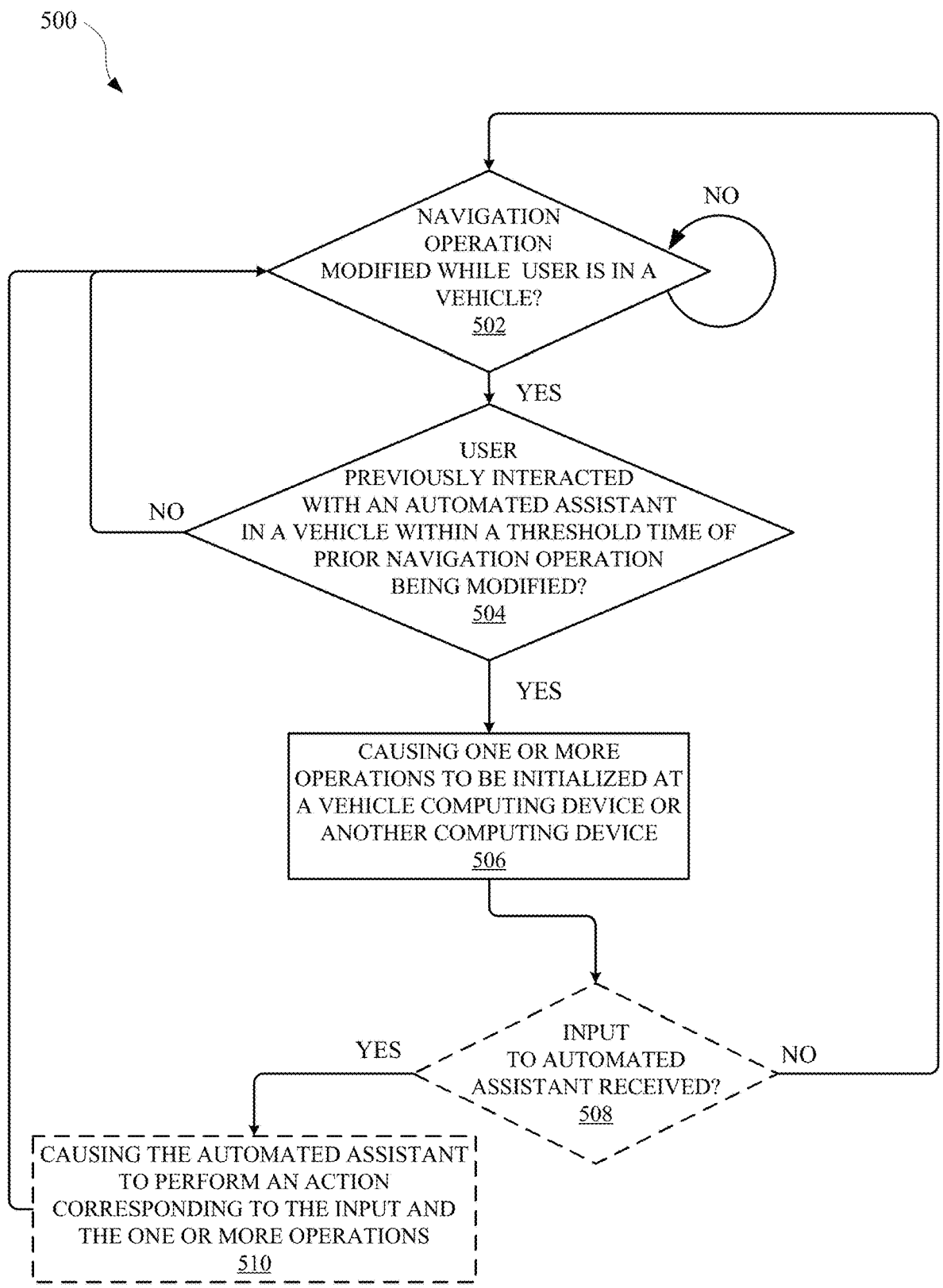
FIG. 5 illustrates a method for preparing an automated assistant to receive one or more inputs while a user is in a vehicle and a destination of the vehicle has been modified.

FIG. 5 illustrates a method 500 for preparing an automated assistant to receive one or more inputs while a user is in a vehicle and a destination of the vehicle has been modified. The method 500 can be performed by one or more applications, devices, and/or any other apparatus or module capable of interacting with an automated assistant. The method 500 can include an operation 502 of determining whether a navigation operation of a vehicle has been modified while a user is in the vehicle. A navigation operation can be performed by the vehicle, a vehicle computing device, and/or a navigation application associated with the user and/or the vehicle. For example, as the user is riding in the vehicle, the user can be driving the vehicle according to directions being provided by a navigation application. Alternatively, as the user is riding in the vehicle, the vehicle can be driving autonomously according to a navigation application that is accessible via the vehicle computing device. The navigation operation can be modified by an input from the user to the automated assistant, the navigation application, and/or any other application or device associated with a vehicle.

When the navigation operation is determined to have been modified by the user while the user is in the vehicle, the method 500 can proceed from the operation 502 to an operation 504. Otherwise, the operation 502 can be performed to determine whether a navigation operation has been modified while the user is in a vehicle. The operation 504 can include determining whether the user previously interacted with an automated assistant in a vehicle within a threshold amount of time of a prior navigation operation being modified. For example, the user may have previously modified the navigation operation of a vehicle or an application, and subsequently, interacted with an automated assistant within a threshold amount of time of modifying the navigation operation. In some instances, based on the change to the navigation operation, the user may realize that there may be additional time added to the route as a result of the change to the navigation operation. In order to occupy this additional time, the user may request that the automated assistant perform a search to identify news related information regarding the new destination. For example, in some instances, the user may ask the automated assistant to look up operating hours of a business that is located at the updated destination. Therefore, based on this habit of the user, one or more operations can be performed to prepare for the automated assistant to be invoked for safety and efficiency purposes when a navigation operation of a vehicle or application is modified.

When the user is determined to have previously invoked the automated assistant within a threshold amount of time of modifying a navigation operation, the method 500 can proceed to an operation 506. Otherwise, the method 500 can return to the operation 502 for determining whether a navigation operation has been modified. The operation 506 can include causing one or more operations to be initialized at a vehicle computing device or another computing device. For example, based on interaction data characterizing prior instances of the user invoking the automated assistant, one or more operations can be identified for preparing for one or more particular inputs from the user. The one or more operations can include, but are not limited to, executing a test query to prepare a search process for receiving a search request from the user; authenticating the user with an application that provides search results; downloading one or more libraries that can be accessed by one or more applications when responding to a user input; and/or any other operations that can be executed to prepare for the automated assistant input from the user.

The method 500 can proceed from the operation 506 to an optional operation 508, which can include determining whether an input to an automated assistant has been received and/or whether the input was received within a threshold amount of time of the modification to the navigation operation. For example, subsequent to the user modifying the destination of the vehicle, the user can provide a spoken utterance such as, "Assistant, what are the operating hours of the bakery?" ("the bakery" can be the new or updated destination for the vehicle). When the input is determined to have been received at the operation 508, the method 500 can proceed to an optional operation 510. Otherwise, the method 500 can return to the operation 502 and/or another operation.

The optional operation 510 can include causing the automated assistant to perform an action corresponding to the input and the one or more operations. For example, the action can be submitting a search query to a website to determine the operating hours of a bakery. The action can be performed with less latency as a result of the one or more operations that were performed at the operation 506. For example, the operation that is performed pre-emptively can include submitting a search query, which can ensure that a proper communication channel is established between the automated assistant and a search server. In this way, when the user subsequently provides the spoken utterance regarding the bakery hours, the response of the automated assistant will be provided with less latency as a result of the preemptively established communication channel.

Figure 6:
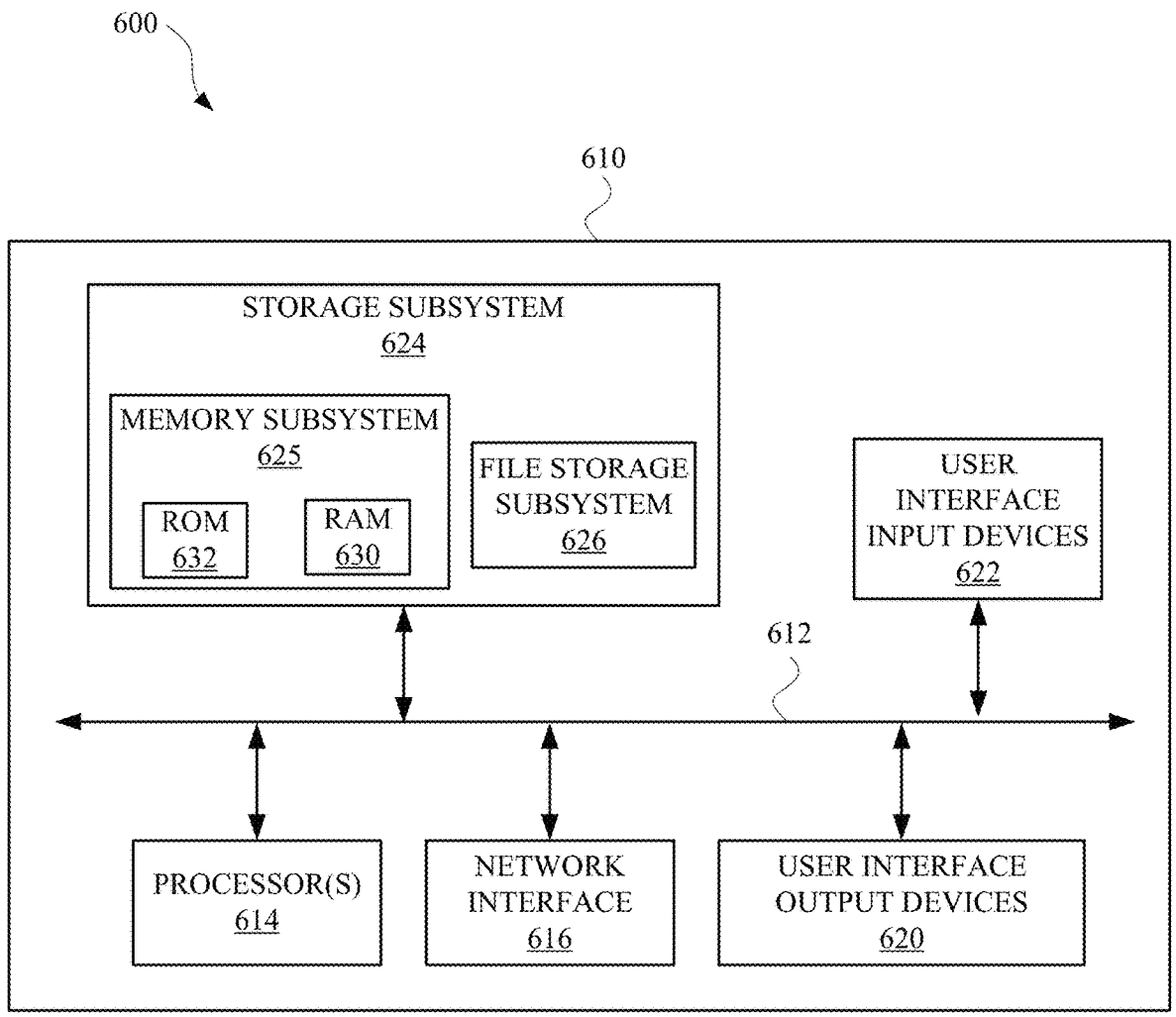
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, method 400, method 500, and/or to implement one or more of system 200, computing device 104, portable computing device, vehicle computing device, server device, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, at a computing device, that an operation of an application has experienced a status change. The method can further include an operation of processing, based on the status change, interaction data that is based on whether, for each of one or more prior instances, a corresponding user interacted with an automated assistant within a threshold period of time of one or more operation status changes occurring at the application or a separate application. The method can further include an operation of determining, at the computing device, that the status change occurred while a user is in a vehicle that is driving toward a destination, wherein the computing device or another computing device provides access to features of the automated assistant while the user is in the vehicle. The method can further include an operation of processing vehicle data in furtherance of determining whether the status change occurred within another threshold period of time of an estimated time of arrival at the destination. The method can further include an operation of, when the interaction data satisfies one or more criteria and when the status change is determined not to have occurred within the other threshold period of time of the estimated time of arrival at the destination: causing one or more operations to be initialized via the computing device or the other computing device, wherein the one or more operations are associated with an action that is performed via the automated assistant.

In some implementations, the method can further include an operation of, when the status change is determined to have occurred within the other threshold period of time of the estimated time of arrival at the destination: causing one or more other operations to be initiated initialized via the computing device or the other computing device without initializing the one or more operations, wherein the one or more other operations are associated with another action that is performed via the automated assistant or a separate application. In some implementations, causing the one or more operations to be initialized includes: identifying a portion of memory of the other computing device to load data associated with the one or more operations, wherein the computing device is a portable computing device that the user has positioned inside of the vehicle, and the other computing device is a vehicle computing device that is integral to the vehicle.

In some implementations, the method can further include an operation of, subsequent to causing the one or more operations to be initialized: determining that the user provided a spoken utterance that includes a request for the automated assistant to perform the action, wherein the automated assistant accesses the portion of memory in response to the spoken utterance, and causing the automated assistant to perform the action in response to the spoken utterance. In some implementations, processing the interaction data includes: determining, based on the interaction data, that the user caused the application to perform the operation that experienced the status change, and identifying, based on the user, one or more actions initialized by the user via the automated assistant during the one or more prior instances in which the user interacted with the automated assistant within the threshold period of time of the one or more operation status changes occurring at the application, wherein the one or more operations are selected for initializing based on the one or more actions.

In some implementations, determining that the operation corresponding to the application has experienced the status change includes: determining that the application has ceased rendering certain information via an interface of the computing device or the other computing device. In some implementations, determining that the status change occurred while the user is in the vehicle that is driving toward the destination includes: determining that a portion of the route to the destination includes an area of limited network activity, wherein the one or more operations initialized via the computing device or the other computing device include a separate operation of retrieving data over a wireless network connection.

In other implementations, a method implemented by one or more processors is set forth as including operations such as determining, at a vehicle computing device of a vehicle, that an electronic communication was received while a user is in the vehicle, wherein the electronic communication is received at the vehicle computing device, or another computing device that is paired with the vehicle computing device. The method can further include an operation of identifying, based on processing interaction data, an action that the user has previously initialized, from within the vehicle via an automated assistant, within a threshold amount of time of receiving a previous communication. The method can further include an operation of determining, based on processing the interaction data, that the user initialized the action within the threshold amount of time of receiving the previous communication when the previous communication had one or more characteristics. The method can further include an operation of, when the electronic communication received by the user has the one or more characteristics: causing one or more operations to be initialized via the vehicle computing device or the other comput-ing device, wherein the one or more operations are associated with the action that was performed via the automated assistant.

In some implementations, the one or more characteristics correspond to a contact, who authored a communication, having contact information that is stored, in association with the user, at the vehicle computing device or the other computing device. In some implementations, the one or more characteristics correspond to a communication that is received at a time of day. In some implementations, the one or more characteristics correspond to a communication that includes certain content. In some implementations, the method can further include an operation of, when the other user, who authored the electronic communication received by the user, does not have the one or more characteristics: causing one or more other operations to be initialized via the vehicle computing device or the other computing device, wherein the one or more other operations are performed via the automated assistant or a separate application without initializing the one or more operations.

In some implementations, causing the one or more operations to be initialized includes: identifying a portion of memory of the vehicle computing device or other computing device to load data associated with the one or more operations, wherein the data corresponds to an automatic speech recognition (ASR) feature of the automated assistant. In some implementations, causing the one or more operations to be initialized includes: communicating authentication data, via a wireless network connection, to a remote server device that is associated with the automated assistant. In some implementations, the method can further include an operation of, subsequent to causing one or more operations to be initialized via the vehicle computing device or the other computing device: determining that the user provided a spoken utterance to the automated assistant in furtherance of causing the automated assistant to perform the action or another action, and causing audio data, corresponding to the spoken utterance, to be communicated to the remote server device via a secured connection that is established using the authentication data.

In some implementations, the action or the other action corresponds to a request for the automated assistant to generate a reminder associated with a received communication. In some implementations, the method can further include an operation of determining that a computational resource will be limited, at the vehicle computing device, within the threshold amount of time of the user receiving the electronic communication, wherein causing the one or more operations to be initialized, via the vehicle computing device or the other computing device, is performed within the threshold amount of time of the user receiving the electronic communication. In some implementations, the computational resource corresponds to an amount of memory that is available to one or more applications that are accessible via the vehicle computing device.

In yet other implementations, a method implemented by one or more processors is set forth as including operations such as determining, at a vehicle computing device, that a navigation operation of a vehicle has experienced a status change, wherein the vehicle computing device provides access to features of an automated assistant when a user is in the vehicle. The method can further include an operation of processing, based on determining the navigation operation experienced the status change, interaction data that is based on one or more prior instances in which the user interacted with the automated assistant within a threshold period of time of the vehicle computing device or another computing device experiencing a separate status change during a prior navigation operation. The method can further include an operation of identifying, based on the interaction data, an action initialized by the user via the automated assistant within the threshold period of time of the vehicle or the other vehicle experiencing the separate status change to the prior navigation operation. The method can further include an operation of causing, based on the interaction data, one or more operations to be initialized via the vehicle computing device, wherein the one or more operations are associated with the action that was initialized via the automated assistant. In some implementations, causing the one or more operations to be initialized via the vehicle computing device includes: causing operation data associated with the one or more operations to be copied to a memory of the vehicle computing device.

We claim:

1. A method implemented by one or more processors, the method comprising:
   determining, at a computing device, that an operation of an application has experienced a status change;
   processing, based on the status change, interaction data that is based on whether, for each of one or more prior instances, a corresponding user interacted with an automated assistant within a threshold period of time of one or more operation status changes occurring at the application or a separate application;
   determining, at the computing device, that the status change occurred while a user is in a vehicle that is driving toward a destination,
      wherein the computing device or another computing device provides access to features of the automated assistant while the user is in the vehicle;
   processing vehicle data in furtherance of determining whether the status change occurred within another threshold period of time of an estimated time of arrival at the destination; and
   when the interaction data satisfies one or more criteria and when the status change is determined not to have occurred within the other threshold period of time of the estimated time of arrival at the destination:
      causing one or more operations to be initialized via the computing device or the other computing device,
         wherein the one or more operations are associated with an action that is performed via the automated assistant.

2. The method of claim 1, further comprising:
   when the status change is determined to have occurred within the other threshold period of time of the estimated time of arrival at the destination:
      causing one or more other operations to be initialized via the computing device or the other computing device without initializing the one or more operations,
         wherein the one or more other operations are associated with another action that is performed via the automated assistant or a separate application.

3. The method of claim 1, wherein causing the one or more operations to be initialized includes:
   identifying a portion of memory of the other computing device to load data associated with the one or more operations,
      wherein the computing device is a portable computing device that the user has positioned inside of the vehicle, and the other computing device is a vehicle computing device that is integral to the vehicle.

4. The method of claim 3, further comprising:
   subsequent to causing the one or more operations to be initialized:
      determining that the user provided a spoken utterance that includes a request for the automated assistant to perform the action,
         wherein the automated assistant accesses the portion of memory in response to the spoken utterance, and
      causing the automated assistant to perform the action in response to the spoken utterance.

5. The method of claim 1, wherein processing the interaction data includes:
   determining, based on the interaction data, that the user caused the application to perform the operation that experienced the status change, and
   identifying, based on the user, one or more actions initialized by the user via the automated assistant during the one or more prior instances in which the user interacted with the automated assistant within the threshold period of time of the one or more operation status changes occurring at the application,
      wherein the one or more operations are selected for initializing based on the one or more actions.

6. The method of claim 1, wherein determining that the operation corresponding to the application has experienced the status change includes:
   determining that the application has ceased rendering certain information via an interface of the computing device or the other computing device.

7. The method of claim 1, wherein determining that the status change occurred while the user is in the vehicle that is driving toward the destination includes:
   determining that a portion of the route to the destination includes an area of limited network activity,
      wherein the one or more operations initialized via the computing device or the other computing device include a separate operation of retrieving data over a wireless network connection.

8. A method implemented by one or more processors, the method comprising:
   determining, at a vehicle computing device of a vehicle, that an electronic communication was received while a user is in the vehicle,
      wherein the electronic communication is received at the vehicle computing device, or another computing device that is paired with the vehicle computing device;
   identifying, based on processing interaction data, an action that the user has previously initialized, from within the vehicle via an automated assistant, within a threshold amount of time of receiving a previous communication;
   determining, based on processing the interaction data, that the user initialized the action within the threshold amount of time of receiving the previous communication when the previous communication had one or more characteristics; and
   when the electronic communication received by the user has the one or more characteristics:
      causing one or more operations to be initialized via the vehicle computing device or the other computing device,
         wherein the one or more operations are associated with the action that was performed via the automated assistant.

9. The method of claim 8, wherein the one or more characteristics correspond to a contact, who authored a communication, having contact information that is stored, in association with the user, at the vehicle computing device or the other computing device.

10. The method of claim 8, wherein the one or more characteristics correspond to a communication that is received at a time of day.

11. The method of claim 8, wherein the one or more characteristics correspond to a communication that includes certain content.

12. The method of claim 8, further comprising:
when the other user, who authored the electronic communication received by the user, does not have the one or more characteristics:
causing one or more other operations to be initialized via the vehicle computing device or the other computing device,
wherein the one or more other operations are performed via the automated assistant or a separate application without initializing the one or more operations.

13. The method of claim 8, wherein causing the one or more operations to be initialized includes:
identifying a portion of memory of the vehicle computing device or other computing device to load data associated with the one or more operations,
wherein the data corresponds to an automatic speech recognition (ASR) feature of the automated assistant.

14. The method of claim 8, wherein causing the one or more operations to be initialized includes:
communicating authentication data, via a wireless network connection, to a remote server device that is associated with the automated assistant.

15. The method of claim 14, further comprising:
subsequent to causing one or more operations to be initialized via the vehicle computing device or the other computing device:
determining that the user provided a spoken utterance to the automated assistant in furtherance of causing the automated assistant to perform the action or another action, and
causing audio data, corresponding to the spoken utterance, to be communicated to the remote server device via a secured connection that is established using the authentication data.

16. The method of claim 14, wherein the action or the other action corresponds to a request for the automated assistant to generate a reminder associated with a received communication.

17. The method of claim 8, further comprising:
determining that a computational resource will be limited, at the vehicle computing device, within the threshold amount of time of the user receiving the electronic communication,
wherein causing the one or more operations to be initialized, via the vehicle computing device or the other computing device, is performed within the threshold amount of time of the user receiving the electronic communication.

18. The method of claim 17, wherein the computational resource corresponds to an amount of memory that is available to one or more applications that are accessible via the vehicle computing device.

19. The method of claim 17, wherein causing the one or more operations to be initialized via the vehicle computing device includes:
causing operation data associated with the one or more operations to be copied to a memory of the vehicle computing device.

20. A method implemented by one or more processors, the method comprising:
determining, at a vehicle computing device, that a navigation operation of a vehicle has experienced a status change,
wherein the vehicle computing device provides access to features of an automated assistant when a user is in the vehicle;
processing, based on determining the navigation operation experienced the status change, interaction data that is based on one or more prior instances in which the user interacted with the automated assistant within a threshold period of time of the vehicle computing device or another computing device experiencing a separate status change during a prior navigation operation;
identifying, based on the interaction data, an action initialized by the user via the automated assistant within the threshold period of time of the vehicle or the other vehicle experiencing the separate status change to the prior navigation operation; and
causing, based on the interaction data, one or more operations to be initialized via the vehicle computing device,
wherein the one or more operations are associated with the action that was initialized via the automated assistant.

* * * * *